(12) United States Patent
Li et al.

(10) Patent No.: US 9,677,959 B2
(45) Date of Patent: Jun. 13, 2017

(54) TESTING DEVICE FOR ELECTROMAGNETIC ATTRACTION FORCE OF A MAGNETIC TRACK BRAKE

(71) Applicant: CRRC QINGDAO SIFANG ROLLING STOCK RESEARCH INSTITUTE CO., LTD., Qingdao (CN)

(72) Inventors: Xiangrui Li, Qingdao (CN); Fan Yang, Qingdao (CN); Baolei Hao, Qingdao (CN); Mingxing Wang, Qingdao (CN); Lei Yang, Qingdao (CN)

(73) Assignee: CRRC QINGDAO SIFANG ROLLING STOCK RESEARCH INSTITUTE CO., LTD., Shandong (CN)

( * ) Notice: Subject to any disclaimer, the term of this patent is extended or adjusted under 35 U.S.C. 154(b) by 0 days.

(21) Appl. No.: 15/306,474

(22) PCT Filed: May 20, 2015

(86) PCT No.: PCT/CN2015/079335
§ 371 (c)(1),
(2) Date: Oct. 24, 2016

(87) PCT Pub. No.: WO2016/127520
PCT Pub. Date: Aug. 18, 2016

(65) Prior Publication Data
US 2017/0052080 A1    Feb. 23, 2017

(30) Foreign Application Priority Data

Feb. 10, 2015   (CN) .......................... 2015 1 0073144
Feb. 10, 2015   (CN) ..................... 2015 2 0093103 U

(51) Int. Cl.
*G01M 19/00*   (2006.01)
*G01L 5/28*   (2006.01)
*G01M 17/08*   (2006.01)

(52) U.S. Cl.
CPC ............... *G01L 5/28* (2013.01); *G01M 17/08* (2013.01)

(58) Field of Classification Search
CPC ....................................................... G01L 5/28
(Continued)

(56) References Cited

U.S. PATENT DOCUMENTS

| 4,991,448 A | 2/1991 | Hayashi .................... 73/862.52 |
| 2003/0010132 A1 | 1/2003 | Scorteanu et al. ............. 73/774 |
| 2017/0057525 A1* | 3/2017 | Wang ................... B60L 3/0092 |

FOREIGN PATENT DOCUMENTS

| CN | 101726374 A | 6/2010 |
| CN | 101865742 A | 10/2010 |

(Continued)

OTHER PUBLICATIONS

Lin, Taiping et al., "Study of electro-magnetic Track Brake Equipment for Railway" China Academy of Railway Sciences, No. 18, vol. 1, (Mar. 1997), pp. 14-28.
(Continued)

*Primary Examiner* — Eric S McCall
(74) *Attorney, Agent, or Firm* — J.C. Patents

(57) ABSTRACT

The present application relates to the technical field of magnetic track brake, and in particular to a testing device for electromagnetic attraction force of a magnetic track brake, comprising a steel rail, a force measuring rail block, a guide groove, an elastic force measuring device and a pull machine, wherein the steel rail consists of segmented steel rails, the groove body of the guide groove is vertically provided between the segmented steel rails, the limiting plate is fixed on an inner wall of the groove body, the force measuring rail block and the elastic force measuring device
(Continued)

are both located inside the groove body, and a bottom of the force measuring rail block is connected to the elastic force measuring device and the pull machine through an intermediate connection rod.

7 Claims, 3 Drawing Sheets

(58) Field of Classification Search
USPC .................................................. 73/121, 128
See application file for complete search history.

(56) References Cited

FOREIGN PATENT DOCUMENTS

| | | |
|---|---|---|
| CN | 202229872 U | 5/2012 |
| CN | 102639422 A | 8/2012 |
| CN | 103693070 A | 4/2014 |
| CN | 103781681 A | 5/2014 |
| CN | 204422126 U | 6/2015 |
| DE | 10 2005 013 142 A1 | 9/2006 |

OTHER PUBLICATIONS

International Search Report of corresponding International PCT Application No. PCT/CN2015/079335, dated Sep. 19, 2014.
Chinese First Examination Report of Chinese Application No. 201510073144.4, dated Jun. 17, 2015.
Chinese Second Examination Report of Chinese Application No. 201510073144.4, dated Jun. 26, 2015.

* cited by examiner

TESTING DEVICE FOR ELECTROMAGNETIC ATTRACTION FORCE OF A MAGNETIC TRACK BRAKE

CROSS-REFERENCE TO RELATED APPLICATION

This application is a national phase application of international application No. PCT/CN2015/079335 filed on May 20, 2015, which in turn claims the priority benefits of Chinese application No. 201510073144.4, filed on Feb. 10, 2015 and Chinese application No. 201520093103.7, filed on Feb. 10, 2015. The contents of these prior applications are hereby incorporated by reference in its entirety.

Technical Field

The present application relates to the technical field of magnetic track brake, and in particular to a testing device for electromagnetic attraction force of a magnetic track brake.

BACKGROUND OF THE INVENTION

With the rapid development of transportation means such as high speed train, subway and light rail, as the indispensable brake component in the brake system of the transportation means, the magnetic track brake is also quickly developed and applied. The electromagnetic attraction force is the leading technical index of the magnetic track brake, and its performance directly influences the magnitude of the brake force generated by the magnetic track brake for the train. Thus, a high-efficient and accurate measurement of the electromagnetic attraction force of the magnetic track brake is very important to the development of the magnetic track brake and the train braking security.

Currently, there are many methods for measuring the electromagnetic attraction force of the magnetic track brake. The conventional measurement method is that the pull machine directly pulls both sides of the magnetic track brake so that the magnetic pole entirely goes away from the rail, and then the magnitude of the magnetic force can be obtained. This measurement method is simple and convenient, but once the forces applied at both ends of the magnetic track brake are uneven, one end of the contact surface will easily drop out, which influences the test result or leads to a failure of the magnetic force test.

A Chinese patent No. CN201080055887 discloses a detection device for an electromagnetic brake. By providing a dynamometer for detecting a restoring force of a brake spring between the brake spring and a spring plate, the brake spring excites a brake arm towards a brake wheel side, and the brake arm is mounted with a brake shoe, the spring plate retains the brake spring in a compressively deformed state, and a judging portion judges whether a brake force of the electromagnetic brake exceeds a specified normal range based on an output of the dynamometer. It is clear that the detection device measures the brake force by measuring the restoring force of the brake spring. This measurement method is adaptive to measure the brake force of an elevator, and it is a detection device for an electromagnetic brake, which is not suitable for testing an electromagnetic attraction force of a magnetic track brake.

SUMMARY OF THE INVENTION

The objective of the present application is to provide a testing device for electromagnetic attraction force of a magnetic track brake, which can high-efficiently and accurately measure the electromagnetic attraction force of the magnetic track brake, and ensure reliability and security of a train travel braking.

The technical solution of the present application is a testing device for electromagnetic attraction force of a magnetic track brake, comprising a steel rail, a force measuring rail block, a guide groove, an elastic force measuring device and a pull machine, wherein the steel rail consists of segmented steel rails, and a magnetic pole of the magnetic track brake is placed on a rail surface of the steel rail; the guide groove comprises a groove body, a cover plate and a limiting plate; the groove body is vertically provided between the segmented steel rails, and the cover plate is demountable mounted at a front side of the groove body;

the limiting plate is fixed on an inner wall of the groove body, the force measuring rail block and the elastic force measuring device are both located inside the groove body, and the force measuring rail block is mounted above the limiting plate; when the magnetic pole is not placed on the steel rail, a lower end of the force measuring rail block is contacted with an upper end of the limiting plate; when the magnetic pole is placed, an upper end of the force measuring rail block is flush with an upper surface of the steel rail and is absorbed on the magnetic pole, and the lower end of the force measuring rail block goes away from the limiting plate;

the elastic force measuring device is mounted below the limiting plate, the force measuring rail block is connected to the elastic force measuring device through an intermediate connection rod, a lower end of the elastic force measuring device is connected to the pull machine, and the pull machine bottom up pulls the elastic force measuring device and the force measuring rail block to move vertically along the inner wall of the groove body.

Further, in order to ensure the measurement accuracy, the groove body is a rectangular groove body having outer walls fixed to the steel rails at both sides, and inner walls set as smooth surfaces.

Further, in order to reduce the friction between the force measuring rail block and the inner wall of the groove body, and the friction between the elastic force measuring device and the inner wall of the groove body, a plurality of apertures storing lubrication grease therein are distributed on the cover plate and the inner wall of the groove body.

Further, four corners of the inner wall of the groove body are mounted with one limiting plate respectively, and the limiting plate is mounted with a soft liner for buffering a collision on the limiting plate generated by the force measuring rail block.

Further, in order to avoid the groove body, the cover plate and the connection rod from influencing the attraction force of the magnetic pole applied to the force measuring rail block, the groove body, the cover plate and the connection rod are all made of nonmagnetic materials.

Further, in order to ensure that the pulling force applied to the force measuring rail block varies evenly, the elastic force measuring device adopts a rectangular elastic block with buffering and force measuring function, and a force measuring sensor for measuring the pulling force is provided in the elastic block.

As compared with the prior art, the present application has the following beneficial effects:

1) in relation to a conventional force measuring device, the attraction force testing device is simple in structure and convenient for the force test, and it avoids an inaccurate test result or a failure of the force test during the conventional test due to the reason that one end of the contact surface will easily drop out;

2) in order to ensure the accuracy of the force test result, the cover plate, the groove body and the connection rod are all made of nonmagnetic materials, the inner surfaces of the groove body are set as smooth surfaces, and a plurality of apertures storing lubrication grease therein are distributed on the cover plate and the inner wall of the groove body, so as to avoid the force test process from being influenced by the movement friction;

3) during the actual force measurement, the force measuring rail block of a unit length may be selected to measure the electromagnetic attraction force, and the electromagnetic attraction force of the force measuring rail block of any length can be obtained according to the relation between the length of the measuring rail block of a unit length and the electromagnetic attraction force; this measurement method can greatly reduce the test area for testing the electromagnetic attraction force of the magnetic track brake, decrease the sensitivity of the magnitude of the electromagnetic attraction force of the magnetic track brake to the test surface of the steel rail, and the measurement result is accurate and stable.

In which, 1—steel rail; 2—force measuring rail block; 3—guide groove; 4—elastic force measuring device; 5—pull machine; 6—groove body; 7—cover plate; 8—soft liner; 9—limiting plate; 10—rail surface; 11—intermediate connection rod; 12—connection rod.

DETAILED DESCRIPTION OF THE EMBODIMENT

In order that the object, the technical solution and the advantages of the present application are clearer, the technical solution of the embodiment of the present application will be described clearly and completely with reference to drawings of the embodiment of the present application. It is apparent that the embodiment described herein is just a part rather than all of embodiments of the present application. Based on the embodiment of the present application, any other embodiment obtained by a person skilled in the art without paying any creative effort shall fall within the protection scope of the present application.

Embodiment 1

Figure 1:
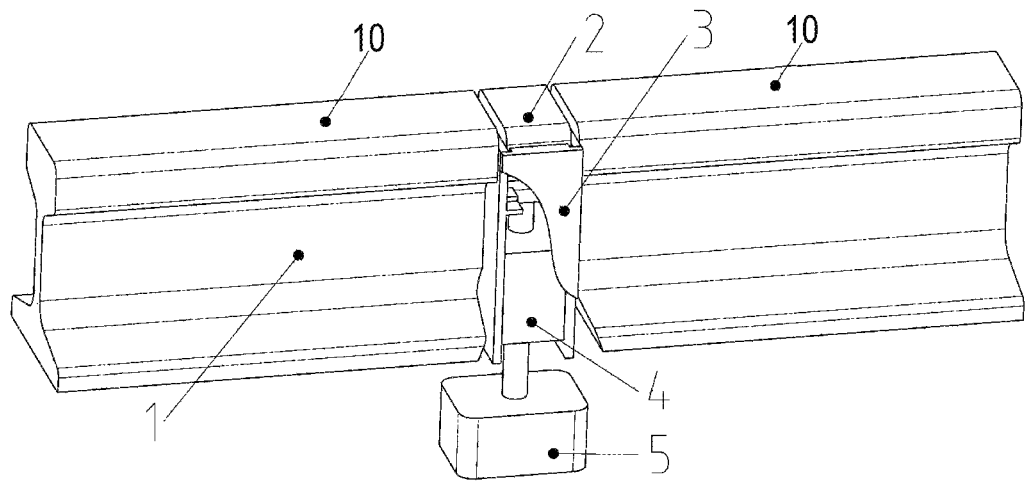
FIG. 1 is a structural diagram (I) of the present application.
Figure 2:
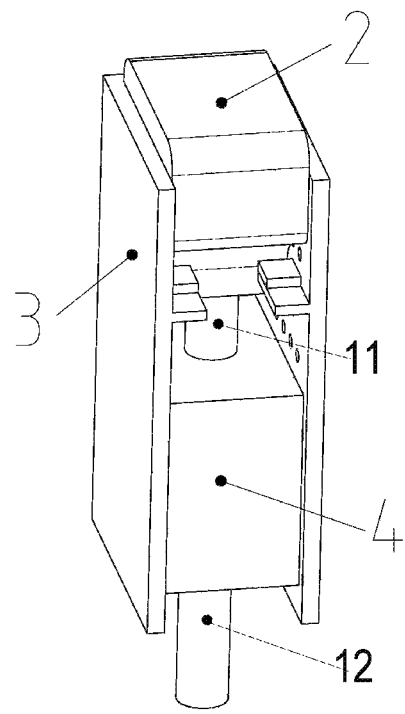
FIG. 2 is a structural diagram (II) of the present application.

Referring to FIGS. 1 and 2, which illustrate a testing device for electromagnetic attraction force of a magnetic track brake, comprising a steel rail 1, a force measuring rail block 2, a guide groove 3, an elastic force measuring device 4 and a pull machine 5, wherein the steel rail 1 consists of segmented steel rails with a gap therebetween for mounting the guide groove 3, and a magnetic pole of the magnetic track brake is placed on a rail surface 10 of the steel rail 1.

Figure 3:
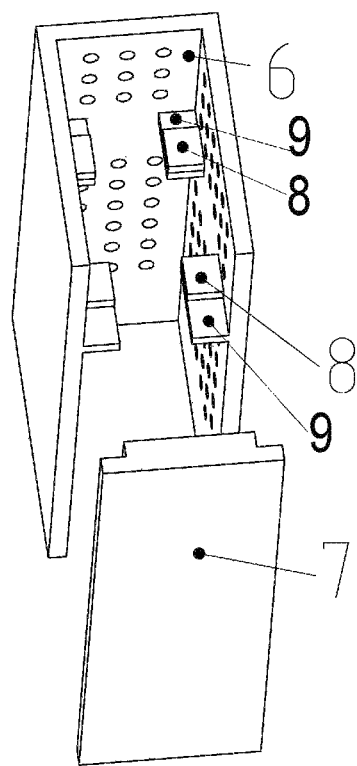
FIG. 3 is a structural diagram (I) of a guide groove.
Figure 4:
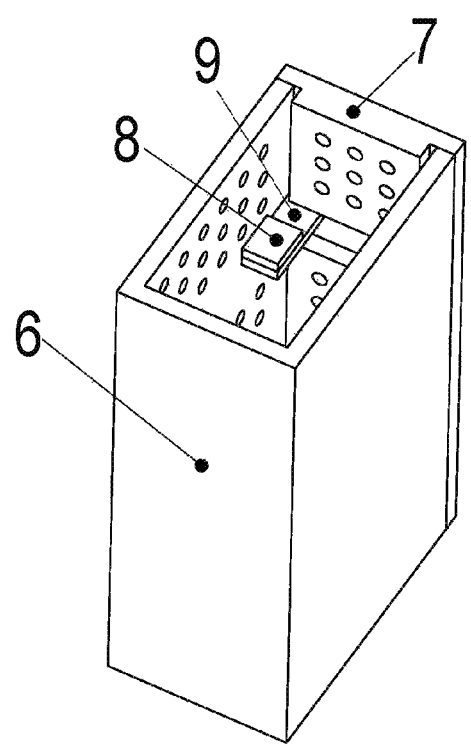
FIG. 4 is a structural diagram (II) of a guide groove.

FIGS. 3 and 4 are structural diagrams of the guide groove 3, which is vertically provided in the gap between the segmented steel rails, and fixed to the steel rails 1 at both sides. The guide groove 3 comprises a groove body 6, a cover plate 7 and a limiting plate 9. The groove body 6 is a rectangular groove body having outer walls fixed to the steel rails 1 at both sides, and inner walls set as smooth surfaces. The limiting plate 9 is fixed on the inner wall of the groove body 6. In addition, four corners of the inner wall of the groove body 6 are mounted with one limiting plate 9 respectively, and the limiting plate 9 is mounted with a soft liner 8 for buffering a collision on a limiting plate 9 generated by the force measuring rail block 2.

The force measuring rail block 2 is located inside the groove body 6 and is mounted above the limiting plate 9, and the force measuring rail block 2 moves vertically along the inner wall of the groove body 6 above the limiting plate 9. When the magnetic pole is not placed, a lower end of the force measuring rail block 2 is contacted with the soft liners 8 at an upper end of the limiting plate 9. When the magnetic pole is placed, the force measuring rail block 2 goes away from the limiting plate 9 under the attraction force, so that an upper end of the force measuring rail block 2 is flush with an upper surface of the steel rail 1 and is absorbed on the magnetic pole, and the lower end of the force measuring rail block 2 goes away from the limiting plate 9.

The elastic force measuring device 4 is located inside the groove body 6 and mounted below the limiting plate 9, and the elastic force measuring device 4 moves vertically along the inner wall of the groove body 6 below the limiting plate 9. An upper end of the elastic force measuring device 4 is connected to the force measuring rail block 2 through a intermediate connection rod 11, a lower end of the elastic force measuring device 4 is connected to the pull machine 5 through a second connection rod 12, and the pull machine 5 pulls the elastic force measuring device 4 and the force measuring rail block 2 to move vertically along the inner wall of the groove body 6.

The cover plate 7 is demountable mounted at a front side of the groove body 6. In order not to influence the attraction force between the magnetic pole and the force measuring rail block 2, the cover plate 7, the groove body 6 and the connection rods are all made of nonmagnetic materials. In order to reduce the frictions on the force measuring rail block 2 and the elastic force measuring device 4 moving along the inner wall of the groove body 6, a plurality of apertures storing lubrication grease therein are distributed on the cover plate 7 and the inner wall of the groove body 6.

The elastic force measuring device 4 adopts a rectangular elastic block, through which a pulling force applied to the force measuring rail block 2 is ensured to vary evenly, and in which a force measuring sensor for measuring the pulling force is provided.

The working process of the attraction force testing device is as follows:

During a measurement, a steel rail of a certain length is selected, and the magnetic pole of the magnetic track brake is placed on the rail surface 10 of the steel rail 1. Under the attraction force of the magnetic pole, the lower end of the force measuring rail block 2 goes away from the limiting plate 9, and the upper end of the force measuring rail block 2 is absorbed on the magnetic pole of the magnetic track brake.

The pull machine 5 is started, through which a downward pulling force is applied to the elastic force measuring device 4 so that it moves vertically downwards along the inner wall of the groove body 6, and transfers the downward pulling force to the force measuring rail block 2. The elastic force measuring device 4 continues moving downwards, and the pulling force applied to the force measuring rail block 2 continuously increases. The force measuring rail block 2 goes away from the magnetic pole when the pulling force applied to the force measuring rail block 2 is equal to the attraction force of the magnetic pole. The force measuring sensor of the elastic force measuring device 4 collects and outputs the maximum pulling force, and at that time, the value of the press is equal to the value of the electromagnetic attraction force of the magnetic pole applied on the force measuring rail block 2.

A person skilled in the art will appreciate that during the actual measurement, the force measuring rail block 2 of a unit length may be selected to measure the electromagnetic attraction force, and the electromagnetic attraction force of the force measuring rail block 2 of any length can be obtained according to the relation between the length of the measuring rail block 2 of a unit length and the electromagnetic attraction force. This measurement method can greatly reduce the test area for testing the electromagnetic attraction force of the magnetic track brake, decrease the sensitivity of the magnitude of the electromagnetic attraction force of the magnetic track brake to the test surface of the steel rail 1, and the measurement result is accurate and stable.

A person skilled in the art will appreciate that the drawings are just diagrams for a preferred embodiment, and the working flows therein are not necessarily required by the present application.

Finally to be noted, the above embodiment is just used to describe the technical solution of the present application, rather than making a limitation thereto. Although the present application is described in details with reference to the above embodiment, a person skilled in the art will appreciate that the technical solution recited in the above embodiment still can be modified, or a part of technical features therein can be equivalently replaced, while those modifications or replacements will not make the essence of corresponding technical solution deviate from the scope of the technical solution of the embodiment of the present application.

The invention claimed is:

1. A testing device for electromagnetic attraction force of a magnetic track brake, comprising a steel rail (1), a force measuring rail block (2), a guide groove (3), an elastic force measuring device (4) and a pull machine (5), wherein the steel rail (1) consists of segmented steel rails, and a magnetic pole of the magnetic track brake is placed on a rail surface (10) of the steel rail (1); the guide groove (3) comprises a groove body (6), a cover plate (7) and a limiting plate (9); the groove body (6) is vertically provided between the segmented steel rails, and the cover plate (7) is demountable mounted at a front side of the groove body (6); the limiting plate (9) is fixed on an inner wall of the groove body the force measuring rail block (2) and the elastic force measuring device (4) are both located inside the groove body (6), and the force measuring rail block (2) is mounted above the limiting plate (9); when the magnetic pole is not placed on the steel rail (1), a lower end of the force measuring rail block (2) is contacted with an upper end of the limiting plate (9); when the magnetic pole is placed, an upper end of the force measuring rail block (2) is flush with an upper surface of the steel rail (1) and is absorbed on the magnetic pole, and the lower end of the force measuring rail block (2) goes away from the limiting plate (9); the elastic force measuring device (4) is mounted below the limiting plate (9), the force measuring rail block (2) is connected to the elastic force measuring device (4) through an intermediate connection rod (11), a lower end of the elastic force measuring device (4) is connected to the pull machine (5), and the pull machine (5) bottom up pulls the elastic force measuring device (4) and the force measuring rail block (2) to move vertically along the inner wall of the groove body (6).

2. The testing device for electromagnetic attraction force of a magnetic track brake according to claim 1, wherein the groove body (6) is a rectangular groove body (6) having outer walls fixed to the steel rails at both sides, and inner walls set as smooth surfaces.

3. The testing device for electromagnetic attraction force of a magnetic track brake according to claim 1, wherein a plurality of apertures storing lubrication grease therein are distributed on the cover plate (7) and the inner wall of the groove body (6).

4. The testing device for electromagnetic attraction force of a magnetic track brake according to claim 1, wherein four corners of the inner wall of the groove body (6) are mounted with one limiting plate (9) respectively, and the limiting plate (9) is mounted with a soft liner (8) for buffering a collision on the limiting plate (9) generated by the force measuring rail block (2).

5. The testing device for electromagnetic attraction force of a magnetic track brake according to claim 1, wherein the cover plate (7), the groove body (6) and the connection rod (11) are all made of nonmagnetic materials.

6. The testing device for electromagnetic attraction force of a magnetic track brake according to claim 1, wherein the elastic force measuring device (4) adopts a rectangular elastic block, in which a force measuring sensor for measuring the pulling force is provided.

7. The testing device for electromagnetic attraction force of a magnetic track brake according to claim 2, wherein a plurality of apertures storing lubrication grease therein are distributed on the cover plate (7) and the inner wall of the groove body (6).

* * * * *